Dec. 18, 1923.
F. L. RHODES
1,477,596
MEANS FOR SUPPORTING AERIAL CABLES
Filed Dec. 5, 1919
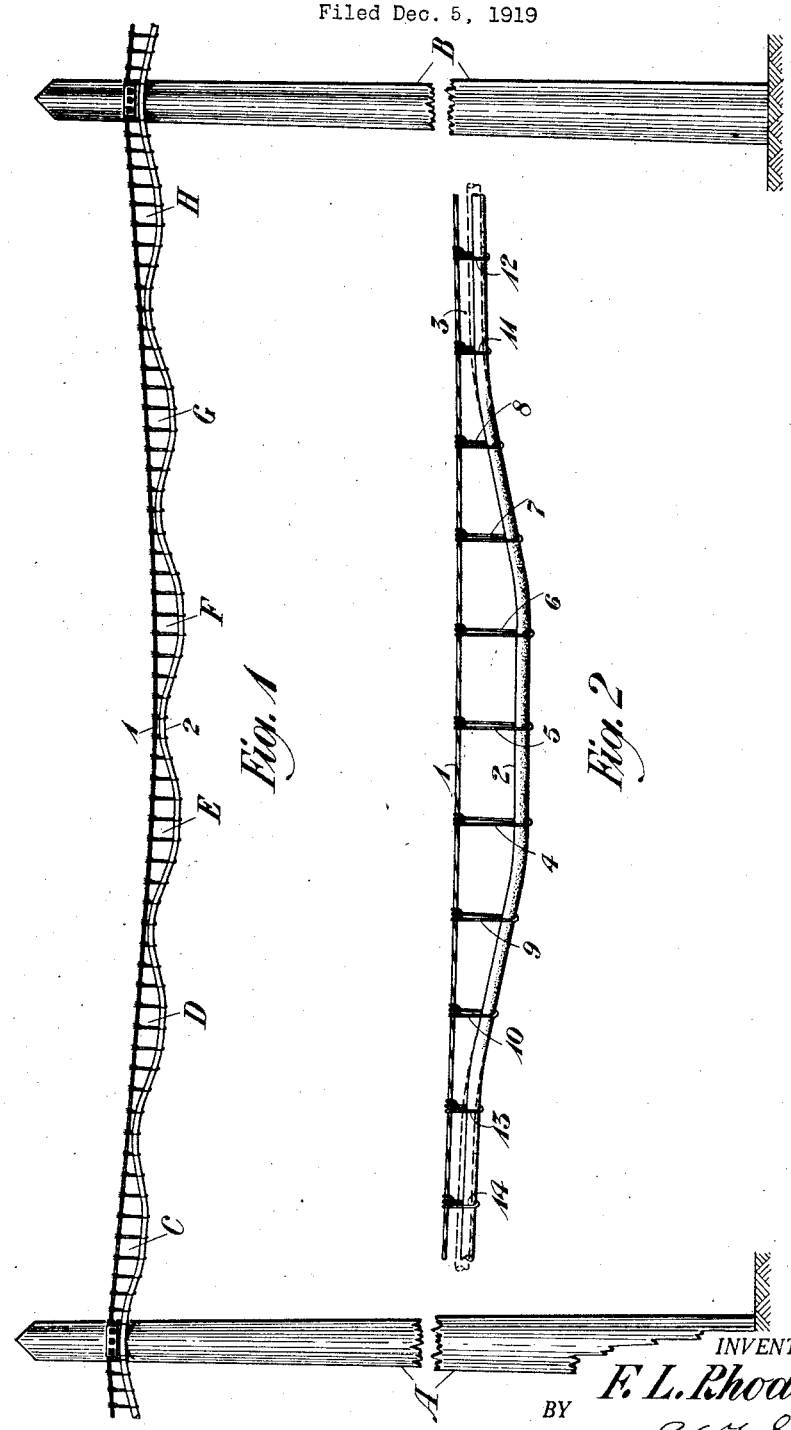
INVENTOR.
F. L. Rhodes
BY
ATTORNEY Patented Dec. 18, 1923.

1,477,596

UNITED STATES PATENT OFFICE.

FREDERICK L. RHODES, OF SHORT HILLS, NEW JERSEY, ASSIGNOR TO AMERICAN TELEPHONE AND TELEGRAPH COMPANY, A CORPORATION OF NEW YORK.

MEANS FOR SUPPORTING AERIAL CABLES.

Application filed December 5, 1919. Serial No. 342,660.

*To all whom it may concern:*

Be it known that I, FREDERICK L. RHODES, residing at Short Hills, township of Milburn, in the county of Essex and State of New Jersey, have invented certain Improvements in Means for Supporting Aerial Cables, of which the following is a specification.

This invention relates to means for supporting aerial cables and more particularly to a supporting arrangement adapted to minimize the deteriorating effect created by the expansion and contraction of the cable resulting from temperature changes.

The present method for supporting aerial cables consists in first extending a messenger strand along the pole line and attaching the strand to each pole of the line. Cable supporting rings are then attached to the said strand at substantially equal distances apart so as to form the support for the cable. The cable is then drawn through the successive rings and lies therein in a position substantially parallel to the messenger strand.

If the pole line is built over territory that is reasonably level the points of attachment of the messenger strand to each pole are at substantially the same distance above the ground and the cable and strand slope downward uniformly toward the center of each span. It has been observed in numerous instances that the position of the cable within the supporting rings changes as time goes on so that the cable ceases to occupy the position substantially parallel to the supporting strand. This change in position is characterized by the buckling of the cable which generally occurs where the messenger strand is attached to the poles, although it it liable to occur also at various points in the span between the poles. Furthermore, observations show that a condition of pronounced distortion of the cable occurring in summer may entirely disappear in cold weather. The result of this slow bending and straightening of the cable, following such a cycle of temperature changes, is crystallization and ultimate cracking of the sheath of the cable which permits the entrance of moisture into the cable unless the condition of the sheath is known and the cable repaired, before actual circuit trouble results.

As is well known, the cable in a span is relatively straight, possesses stiffness and is confined in the rings so that any increase in length is directed and forced toward the poles, At the poles, which form a dividing line between two adjacent spans, the cable is bent from the substantially straight line that it occupies in the span, and the increase in length of cable would normally collect at this bend, unless the cable at some point in the span offers less resistance to bending than is offered at the poles.

It is the object of this invention to prevent or to minimize the detrimental effect caused in a cable by the repeated bending and straightening of the cable through varying cycles of temperature changes.

This invention will be better understood from the following description, when read in connection with the attached drawing, of which Figure 1 shows a general view of a span of cable in which the invention is employed, and Fig. 2 is a detailed view of the mode in which the invention is put into effect.

Fig. 1 shows a single span of an aerial cable supported by two poles A and B, which may be considered as two poles of a long pole line along which the aerial cable extends. 1 represents a supporting messenger strand of the type which is ordinarily used in telephone or telegraph pole line construction. The strand is attached to the poles A and B by means of a clamp. This strand may, when placed, have the proper amount of sag and tension for the length of span. The entire span between the two poles should then be divided into what may be termed "auxiliary spans," of equal length, the magnitude of which will be dependent upon the size and the weight of the cable to be supported. Fig. 1 shows for example the span between the poles A and B divided into six auxiliary spans designated C, D, E, F, G and H. In each of these auxiliary spans the cable 2 curves uniformly downward from the supporting rings at each end of the auxiliary span to the mid point of the auxiliary span. The cable in each of the said spans is supported by a plurality of rings which may be of such size as to permit the cable to assume the proper curvature within the auxiliary span. The effect of the breaking up of the main span into a plurality of auxiliary spans is to introduce a plurality of bends in a length of cable which under normal conditions would be substantially straight; thereby distributing among a plurality of bends the increase in length which normally collected in one place.

Fig. 2 shows in detail in solid lines the normal position of the cable in one of these auxiliary spans and in dotted lines the approximate position that the cable assumes in order to care for the increased length of cable created by increase of temperature. 1 represents a messenger strand and 2 represents the cable which is supported therefrom by means of a plurality of rings which may be of any well-known type but preferably are of that type which grips the strand extremely tightly, thereby minimizing the slippage of the ring along the strand when the cable is being drawn into position. In order to avoid this tendency of the rings to slip during the process of installing the cable it is desirable that the length of each of the successive rings, that is, the distance from the strand to the inner surface of the ring which supports the cable, should be such that the cable will slip readily from ring to ring, thereby minimizing the tendency to drag the rings along the strand.

Fig. 2 shows an arrangement in which the rings 4, 5 and 6 at the center of the auxiliary span are of substantially the same length. Rings 11 and 12, and the corresponding rings 13 and 14 are of the same length which may preferably be that of the ring now employed for suspending aerial cables. The length of rings 7 and 8, and of rings 9 and 10 which occupy a corresponding position on the opposite side of the auxiliary span should be such as to permit the cable to assume an easy curve from rings 12 to 4 and from rings 13 to 6. If the cable has been drawn into position within the rings attached to the messenger strand it will assume substantially the position shown in Fig. 1 and the cable in each auxiliary span will assume within the rings substantially the position shown by the full lines in Fig. 2. With increasing temperature the cable will expand accordingly and will tend to rise in a vertical plane, assuming thereby the position shown by the dotted lines in Fig. 2. It will be seen therefore that the excess length of cable in adjacent half-spans of the auxiliary spans may be accumulated between the adjacent auxiliary spans and cared for by a slight rise of cable instead of being pushed along and accumulated in much larger quantity at the poles as resulted from the practice heretofore employed.

Since the increase in length of a large span, that is to say, some 100 to 120 feet, amounts only to a few inches, it is believed that with sufficient number of auxiliary spans the increase in length of each auxiliary span of cable will be so small that the bending of the cable at the dividing point between any two auxiliary spans will not produce harmful effects upon the cable sheath.

It is to be understood that this invention is not limited to a specific number of auxiliary spans such as, for instance, is shown in Fig. 1, nor is it limited to the specific number, arrangement, size or form of the supporting rings shown in detail in Fig. 2. These figures simply illustrate in general the method and arrangement whereby may be prevented the detrimental effects caused by the accumulation of a large amount of cable at certain points along the cable, in consequence of which crystallization and destruction of the sheath usually results.

Although this invention has been shown as embodied in a specific form, it is to be understood that it is not limited to such form but is capable of embodiment in other and different forms within the scope of the appended claims.

What is claimed is:

1. In a supporting mechanism, the combination with supporting means of a plurality of connecting means of various lengths disposed along said supporting means, and a flexible object suspended by said connecting means in a series of loops, each having a predetermined sag.

2. In a supporting mechanism, the combination of a stranded wire rope, a cable to be suspended therefrom, a plurality of rings of varying lengths connected with said stranded rope and adapted to support said cable, said rings being arranged in such a sequence with regard to their length to support said cable in a series of uniform loops.

3. In a supporting mechanism, the combination of a plurality of poles, a wire adapted to span between successive poles and attached thereto, a flexible object to be suspended from said wire, a plurality of looping means of varying lengths connected with said wire and supporting loosely said flexible object in a series of loops, each having a predetermined sag.

4. In a supporting mechanism, the combination of a plurality of poles constituting a transmission pole line, a messenger strand extending along said line and attached to each of said poles, a flexible cable suspended from said strand, a plurality of cable rings designed to grip said strand and to form a bearing surface for said cable, said rings being of various lengths and arranged in such a sequence that the cable will be suspended in a series of uniform loops from said strand.

5. In a supporting mechanism, the combination of supporting means, a flexible object to be supported and a plurality of connecting means of various lengths so disposed along said supporting means as to support the said flexible object in a series of loops, the sag of which is determined and controlled by the said connecting means.

In testimony whereof, I have signed my name to this specification this 4th day of December 1919.

FREDERICK L. RHODES.